(12) United States Patent
Takiguchi

(10) Patent No.: US 10,606,527 B2
(45) Date of Patent: Mar. 31, 2020

(54) IMAGE FORMING APPARATUS

(71) Applicant: KYOCERA Document Solutions Inc., Osaka (JP)

(72) Inventor: Fumiaki Takiguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/168,585

(22) Filed: Oct. 23, 2018

(65) Prior Publication Data

US 2019/0187941 A1  Jun. 20, 2019

(30) Foreign Application Priority Data

Dec. 20, 2017  (JP) .................. 2017-244184

(51) Int. Cl.

| | | |
|---|---|---|
| G06F 3/12 | (2006.01) | |
| G06F 1/3234 | (2019.01) | |
| H04N 5/33 | (2006.01) | |
| G01S 17/08 | (2006.01) | |
| G06K 15/02 | (2006.01) | |
| G01S 17/02 | (2020.01) | |
| G03G 15/00 | (2006.01) | |

(52) U.S. Cl.
CPC .......... *G06F 3/1221* (2013.01); *G01S 17/026* (2013.01); *G01S 17/08* (2013.01); *G03G 15/5016* (2013.01); *G03G 15/5091* (2013.01); *G03G 15/5004* (2013.01); *G06F 1/3284* (2013.01); *H04N 5/33* (2013.01)

(58) Field of Classification Search
None
See application file for complete search history.

(56) References Cited

U.S. PATENT DOCUMENTS

| | | | | |
|---|---|---|---|---|
| 2013/0073887 | A1* | 3/2013 | Miki | ..................... G06F 1/3231 |
| | | | | 713/323 |
| 2013/0314360 | A1* | 11/2013 | Saitoh | ................... G06F 3/0412 |
| | | | | 345/173 |
| 2015/0261168 | A1* | 9/2015 | Yokoyama | ............. G03G 15/80 |
| | | | | 399/81 |
| 2015/0277576 | A1* | 10/2015 | Sueishi | ................... G06F 3/017 |
| | | | | 345/174 |
| 2016/0150111 | A1* | 5/2016 | Sakamoto | .......... H04N 1/00896 |
| | | | | 358/1.13 |
| 2016/0277599 | A1* | 9/2016 | Nagasawa | .......... H04N 1/00084 |
| 2017/0090745 | A1* | 3/2017 | Urakawa | ............. G06F 3/04883 |
| 2018/0224963 | A1* | 8/2018 | Lee | ........................ G06F 3/0488 |
| 2018/0321732 | A1* | 11/2018 | Fukushi | ................ G06F 1/3231 |

FOREIGN PATENT DOCUMENTS

JP  2010-197433 A  9/2010

\* cited by examiner

*Primary Examiner* — Beniyam Menberu
(74) *Attorney, Agent, or Firm* — Stein IP, LLC

(57) ABSTRACT

An image forming apparatus has an operation portion, an operation sensing portion, a human detecting portion, and a sensing period adjusting portion. The operation portion accepts operation by a user. The operation sensing portion senses operation on the operation portion. The human detecting portion detects the presence of a human body within a previously set detection distance. The sensing period adjusting portion adjusts a operation sensing period of the operation sensing portion based on the detection distance of the human detecting portion.

5 Claims, 5 Drawing Sheets

IMAGE FORMING APPARATUS

INCORPORATION BY REFERENCE

This application is based upon and claims the benefit of priority from the corresponding Japanese Patent Application No. 2017-244184 filed on Dec. 20, 2017, the entire contents of which are incorporated herein by reference.

BACKGROUND

The present disclosure relates to an image forming apparatus.

Some image forming apparatuses such as copiers, printers, or facsimile machines incorporate an operation portion at the front of the apparatus. The operation portion accepts operation by a user with respect to the apparatus. In recent years, some image forming apparatuses incorporate a human detecting portion for detecting the presence of a human body around the apparatus. There is known an example of a conventional image forming apparatus that incorporates such an operation portion and a human detecting portion.

The conventional image forming apparatus incorporates an operation panel and a human detecting sensor. The human detecting sensor detects that a human is close to the apparatus main body. This image forming apparatus previously counts the results of detection by the human detecting sensor for each of different time zones. This image forming apparatus keeps the operation panel lit in a time zone when many people approach the apparatus main body, and keeps the operation panel extinguished in a time zone when few people approach the apparatus main body. This makes it possible to reduce power consumption in the image forming apparatus.

SUMMARY

According to one aspect of the present disclosure, an image forming apparatus includes an operation portion, an operation sensing portion, a human detecting portion, and a sensing period adjusting portion. The operation portion accepts operation by a user. The operation sensing portion senses operation on the operation portion. The human detecting portion detects the presence of a human body within a previously set detection distance. The sensing period adjusting portion adjusts a operation sensing period of the operation sensing portion based on the detection distance of the human detecting portion.

DETAILED DESCRIPTION

Hereinafter, with reference to the accompanying drawings, embodiments of the present disclosure will be described. The present disclosure is not limited to what is disclosed herein.

Figure 1:
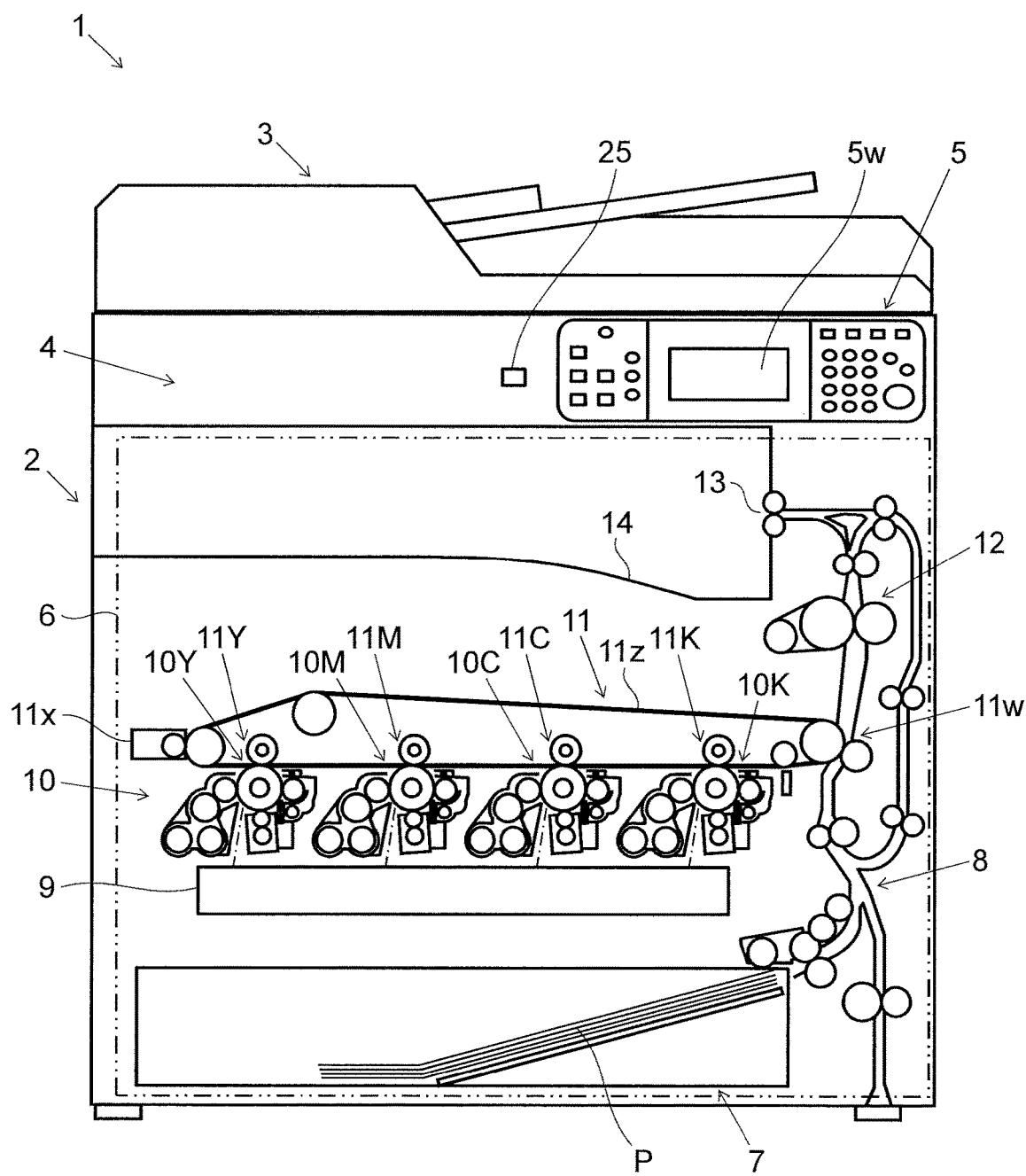
FIG. 1 is a front view showing the structure of an image forming apparatus according to a first embodiment of the present disclosure.
Figure 2:
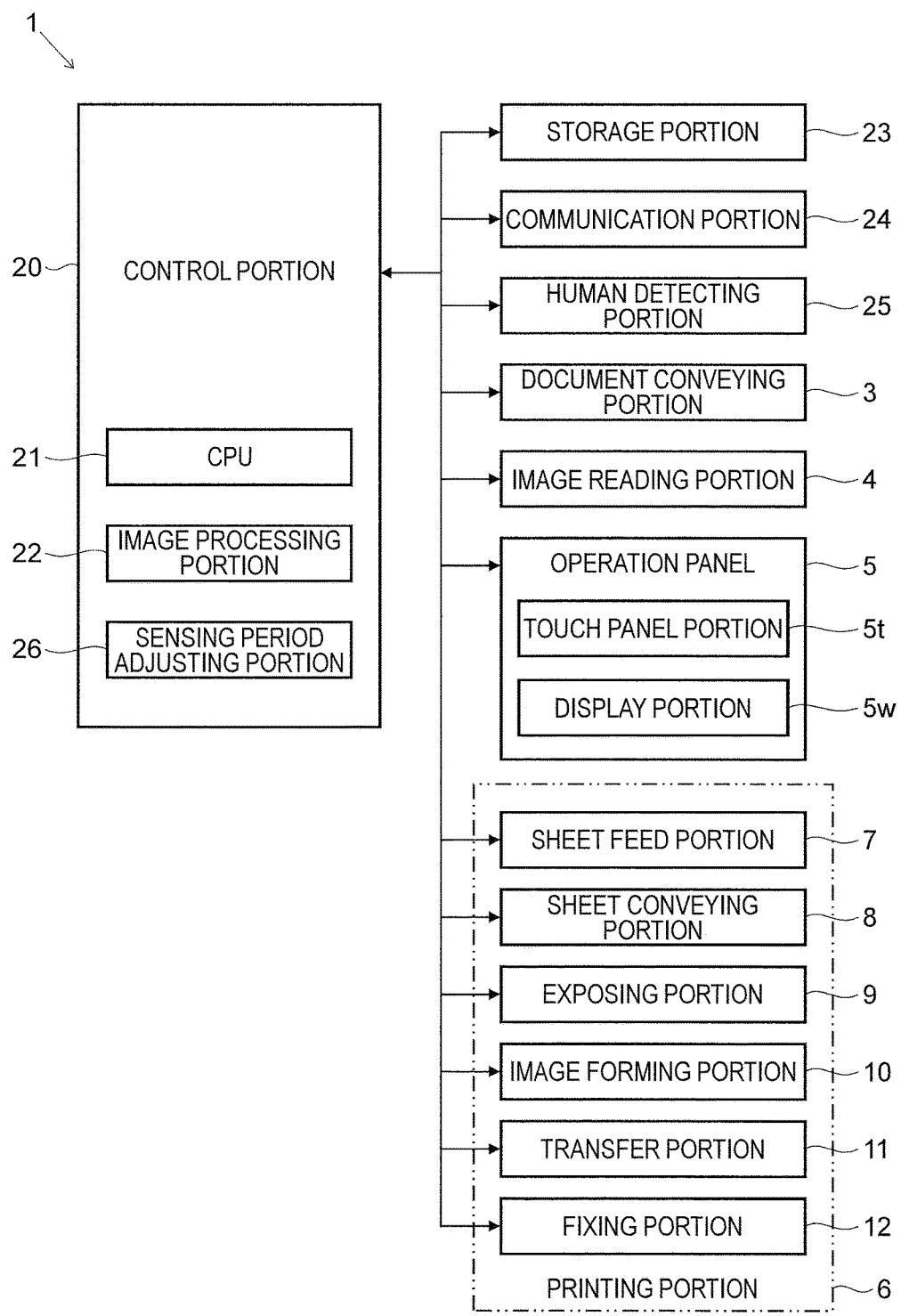
FIG. 2 is a block diagram showing the structure of the image forming apparatus according to the first embodiment of the present disclosure.

First, as to an image forming apparatus according to a first embodiment of the present disclosure, its structure will be described with reference to FIGS. 1 and 2. FIG. 1 is a front view showing an example of the outline of the image forming apparatus. FIG. 2 is a block diagram showing the structure of the image forming apparatus. The image forming apparatus 1 is a so-called multifunction peripheral having a plurality of functions, such as printing, scanning (image reading), and facsimile transmission, and is of a color printing type which transfers toner images to a sheet by use of an intermediate transfer belt.

In the image forming apparatus 1, as shown in FIG. 1, on the top face of a main body 2, a document conveying portion 3 is placed, and inside the main body 2, under the document conveying portion 3, an image reading portion 4 is provided. An image of a document placed on the document conveying portion 3 or an image of a document placed on unillustrated contact glass in the top face of the image reading portion 4 is read by the image reading portion 4.

In an upper part of the main body 2, on the front side of the image reading portion 4, an operation panel (operation portion) 5 is provided. The operation panel 5 accepts, for example, operation by a user, such as input of instructions for making the image forming apparatus 1 execute a printing job, a scanning (image reading) job, a facsimile transmission job, and the like, and input of settings related to these instructions. The operation panel 5 displays, for example, apparatus status, cautions, and error messages on a display portion 5w.

The image forming apparatus 1 includes, in a part of the main body 2 under the image reading portion 4, a printing portion 6. The printing portion 6 executes a printing job. The printing portion 6 includes a sheet feed portion 7, a sheet conveying portion 8, an exposing portion 9, an image forming portion 10, a transfer portion 11, and a fixing portion 12.

The sheet feed portion 7 stores a plurality of sheets P, and separates and feeds out the sheets P one by one during printing. The sheet conveying portion 8 conveys the sheets P fed out from the sheet feed portion 7 to a secondary transfer portion 11w and the fixing portion 12, and then discharges the sheets P having undergone fixing from a sheet discharge port 13 to a sheet discharge portion 14. The exposing portion 9 radiates laser light controlled based on image data toward the image forming portion 10.

The image forming portion 10 is provided with four image forming portions, namely an image forming portion 10Y for yellow, an image forming portion 10M for magenta, an image forming portion 100 for cyan, and an image forming portion 10K for black. In the following description, unless distinction is necessary, the suffixes "Y", "M", "C", and "K" distinguishing different colors will be omitted.

The transfer portion 11 includes an intermediate transfer belt 11z, primary transfer portions 11Y, 11M, 11C, and 11K, a secondary transfer portion 11w, and an intermediate transfer cleaning portion 11x. The four image forming portions 10 are arranged in a so-called tandem formation, that is, in a line from the upstream side to the downstream side of the intermediate transfer belt 11z in its rotation direction.

The image forming portions 10 for different colors form electrostatic latent images based on a document image with the laser light emitted from the exposing portion 9, and form toner images based on the electrostatic latent images. The toner images are primarily transferred to the surface of the intermediate transfer belt 11z in the primary transfer portions 11Y, 11M, 11C, and 11K arranged over the image forming portions for different colors 10Y, 10M, 10C, and 10K. Then, as the intermediate transfer belt 11z rotates, the toner images in the image forming portions 10 are transferred to the intermediate transfer belt 11z with predetermined timing. Thus, on the surface of the intermediate transfer belt 11z, a color toner image is formed that has toner images of four colors, namely yellow, magenta, cyan, and black superimposed on each other.

The color toner image on the surface of the intermediate transfer belt 11z is transferred to the sheet P conveyed synchronously by the sheet conveying portion 8 at a secondary transfer nip portion formed in the secondary transfer portion 11w. The intermediate transfer cleaning portion 11x cleans the surface of the intermediate transfer belt 11z by removing toner that remains on it after secondary transfer.

The fixing portion 12 heats and presses the sheet P having the toner image transferred to it, and thereby fixes the toner image to the sheet P. In this way, the printing portion 6 prints the document image on the sheet P.

The image forming apparatus 1 includes a control portion 20 and a storage portion 23 shown in FIG. 2 for controlling the operation of the whole apparatus. The control portion 20 includes, for example, a CPU 21, an image processing portion 22, and other unillustrated electronic circuits and components. The CPU 21 performs processing related to the functions of the image forming apparatus 1 by controlling the operation of individual constituent elements provided in the image forming apparatus 1 based on programs and data for control stored in the storage portion 23. The image processing portion 22 performs image processing on image data used in image formation, image reading, and transmission. The storage portion 23 is composed of, for example, a combination of a non-volatile storage device, such as program ROM and data ROM, and a volatile storage device, such as RAM, of which none is illustrated.

The image forming apparatus 1 includes a communication portion 24. The communication portion 24 performs communication, such as exchange of facsimile and image data with an external communication device, a computer, or the like. The communication portion 24 is connected to a telephone line or a network line, and performs exchange of image data and the like with the external communication device, computer, or the like by use of such a line. The control portion 20 makes the communication portion 24 perform exchange of data with the external communication device or the like.

Figure 3:
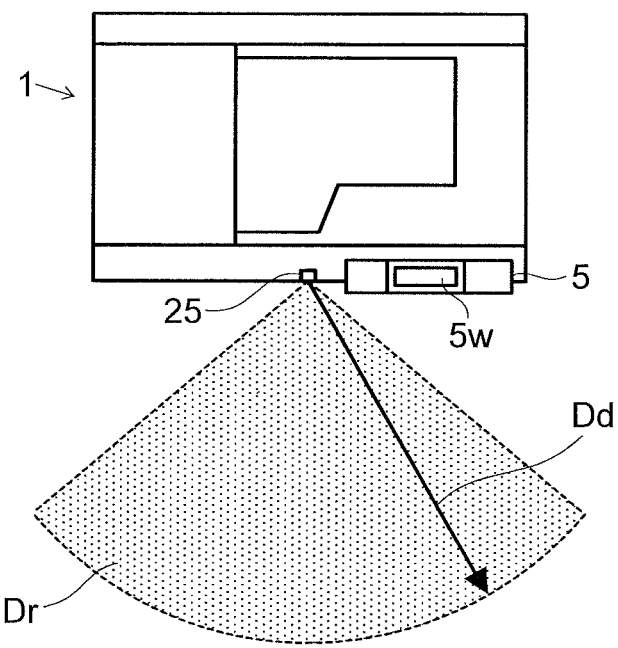
FIG. 3 is a top view showing a detection distance and a detection range of a human detecting portion in the image forming apparatus according to the first embodiment of the present disclosure.
Figure 4:
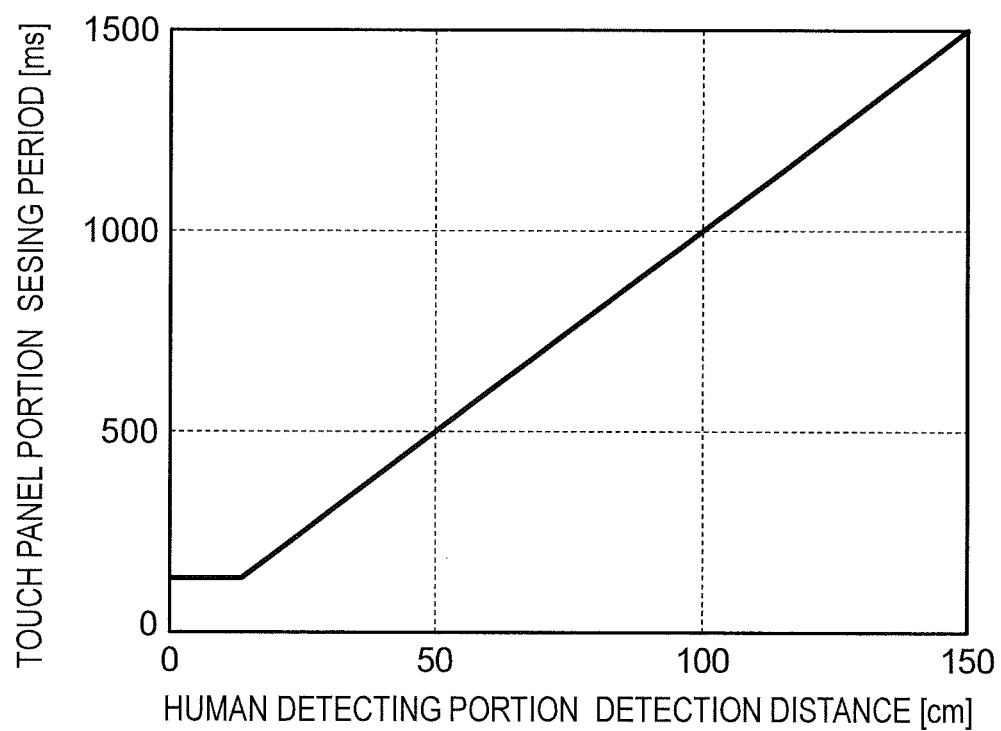
FIG. 4 is an explanatory diagram showing a relationship between the detection distance of the human detecting portion and a sensing period of a touch panel portion in the image forming apparatus according to the first embodiment of the present disclosure.

Now, the configuration of the image forming apparatus 1 will be described in detail with reference to FIGS. 3 and 4 along with FIGS. 1 and 2. FIG. 3 is a top view showing a detection distance and a detection range of a human detecting portion in the image forming apparatus 1. FIG. 4 is an explanatory diagram showing a relationship between the detection distance of the human detecting portion and a sensing period of a touch panel portion in the image forming apparatus 1.

The image forming apparatus 1 includes a human detecting portion 25. The human detecting portion 25 is provided, for example, close to the operation panel 5 at the front of the image forming apparatus 1. The human detecting portion 25 includes, for example, a human presence sensor comprising an infrared sensor, and various circuits. The human detecting portion 25 can detect the presence of a human body within a previously set detection distance around the image forming apparatus 1.

As shown in FIG. 3, the human detecting portion 25 detects the presence of a human body within a range Dr of a detection distance Dd on the front side of the image forming apparatus 1. The detection range Dr of the human detecting portion 25 is formed in the shape of a fan that expands from right to left within a predetermined angle range about the position of the human detecting portion 25. The detection range Dr of the human detecting portion 25 can be set as necessary and as desired to be an angle range of, for example, 90 degrees or 120 degrees. Likewise, the detection distance Dd of the human detecting portion 25 can be set as necessary and as desired to be a distance of, for example, 50 cm or 100 cm from the image forming apparatus 1. Based on the output of the human detecting portion 25, the control portion 20 detects whether or not a user is present within the detection distance Dd around the image forming apparatus 1.

The operation panel 5 includes a touch panel portion 5t on the top face of the display portion 5w. The touch panel portion 5t can sense touch operations on the display portion 5w by a user. The touch panel portion 5t outputs a voltage signal corresponding to a position at which a touch operation is sensed. The control portion 20 controls display on the display portion 5w. Based on the output of the touch panel portion 5t, the control portion 20 recognizes that a touch operation is being made on the touch panel portion 5t, and recognizes the touch position.

The image forming apparatus 1 has operation modes including a normal mode in which it performs normal operation by supplying electric power to all the constituent elements and a power-saving mode in which it performs power-saving operation by supplying electric power to only part of the constituent elements. The power-saving mode is an operation mode intended to save energy in the image forming apparatus 1. For example, when no operation is performed on the image forming apparatus 1 for a predetermined period, or when the image forming apparatus 1 receives an instruction to switch to the power-saving mode from the operation panel 5 or the like, the image forming apparatus 1 can shift from the normal mode to the power-saving mode. In the power-saving mode, for example, when image data or a print instruction is received from an external computer or the like, or when the human detecting portion 25 detects the presence of a user within the range Dr of the detection distance Dd, the image forming apparatus 1 returns to the normal mode.

In the power-saving mode, when the human detecting portion 25 detects the presence of a user within the range Dr of the detection distance Dd, the control portion 20 makes, first, the operation of the operation panel 5 (the display portion 5w, the touch panel portion 5t) return to the normal mode.

Between the normal mode and the power-saving mode, the period at which a touch operation on the display portion 5w is sensed by the touch panel portion 5t is different. In the normal mode, for example, the period of sensing a touch operation by the touch panel portion 5t is set at 8 msec. In the power-saving mode, for example, the period of sensing a touch operation by the touch panel portion 5t is adjusted by a sensing period adjusting portion 26.

The control portion 20 includes the sensing period adjusting portion 26. The function of the sensing period adjusting portion 26 is achieved, for example, by the CPU 21 performing operational processing according to a program, but may instead be achieved by an electrical hardware circuit.

For example, data defining a relationship between the detection distance Dd of the human detecting portion 25 and the sensing period of the touch panel portion 5t as shown in FIG. 4 is previously stored in the storage portion 23 or the like, and is used by the sensing period adjusting portion 26. Based on the use environment of the image forming apparatus 1, the detection distance Dd of the human detecting portion 25 is previously set by a user.

For example, in a case where the distance from a user's seat or the like to the image forming apparatus 1 is short, the detection distance Dd of the human detecting portion 25 is set rather short. In this case, the sensing period adjusting portion 26 sets the touch operation sensing period of the touch panel portion 5t rather short. For another example, in a case where the image forming apparatus 1 is arranged in a comparatively large open space, the detection distance Dd of the human detecting portion 25 is set rather long. In this case, the sensing period adjusting portion 26 sets the touch operation sensing period of the touch panel portion 5t rather long.

In this way, based on the detection distance Dd of the human detecting portion 25, the sensing period adjusting portion 26 adjusts the touch operation sensing period of the touch panel portion 5t. With this configuration, according to the detection distance Dd of the human detecting portion 25 that is previously set, the touch operation sensing period for the operation panel 5 is adjusted. It is thus possible to provide an image forming apparatus 1 with improved operability and reduced power consumption.

In the power-saving mode, the sensing period adjusting portion 26 adjusts the touch operation sensing period of the touch panel portion 5t based on the detection distance Dd of the human detecting portion 25. In the normal mode, the sensing period adjusting portion 26 sets the touch operation sensing period of the touch panel portion 5t shorter than the sensing period in the power-saving mode (for example, 8 msec). With this configuration, in the power-saving mode, it is possible to extend the touch operation sensing period for the operation panel 5, and this makes it possible to further reduce power consumption in the image forming apparatus 1. On the other hand, in the normal mode, it is possible to cope with operation on the operation panel 5 promptly, and this makes it possible to improve the operability of the image forming apparatus 1.

As shown in FIG. 4, the longer the detection distance Dd of the human detecting portion 25 is, the longer the sensing period adjusting portion 26 sets the touch operation sensing period of the touch panel portion 5t. With this configuration, the longer the detection distance Dd of the human detecting portion 25 is, the more effectively power consumption in the image forming apparatus 1 can be reduced.

As the detection distance Dd of the human detecting portion 25, for example, a standard distance is previously determined as a predetermined distance. For example, the predetermined distance related to the detection distance Dd of the human detecting portion 25 is previously determined to be 100 cm. In a case where the detection distance Dd of the human detecting portion 25 is a predetermined distance of 100 cm, the touch operation sensing period of the touch panel portion 5t is previously determined, for example, to be 1000 msec.

For example, in a case where the detection distance Dd set for the human detecting portion 25 is 50 cm, which is shorter than the predetermined distance of 100 cm, the sensing period adjusting portion 26 sets the touch operation sensing period of the touch panel portion 5t at 500 msec, which is shorter than the sensing period 1000 msec as it is when the predetermined distance is 100 cm. In this way, in a case where the detection distance Dd of the human detecting portion 25 is set shorter than the predetermined distance, the sensing period adjusting portion 26 sets the touch operation sensing period of the touch panel portion 5t shorter than the sensing period as it is when the predetermined distance is set. With this configuration, when a user comes close to the image forming apparatus 1, it is possible to make the touch panel portion 5t more promptly cope with touch operations by a user. This makes it possible to improve the operability of the image forming apparatus 1.

For example, in a case where the detection distance Dd set for the human detecting portion 25 is 150 cm, which is longer than the predetermined distance 100 cm, the sensing period adjusting portion 26 sets the touch operation sensing period of the touch panel portion 5t at 1500 msec, which is longer than the sensing period 1000 msec as it is when the predetermined distance is 100 cm. In this way, in a case where the detection distance Dd of the human detecting portion 25 is set longer than the predetermined distance, the sensing period adjusting portion 26 sets the touch operation sensing period of the touch panel portion 5t longer than the sensing period as it is when the predetermined distance is set. With this configuration, for example, in a case where a user's seat or the like is away from the image forming apparatus 1, it is possible to reduce power consumption in the touch panel portion 5t as much as possible. This makes it possible to further reduce power consumption in the image forming apparatus 1.

Figure 5:
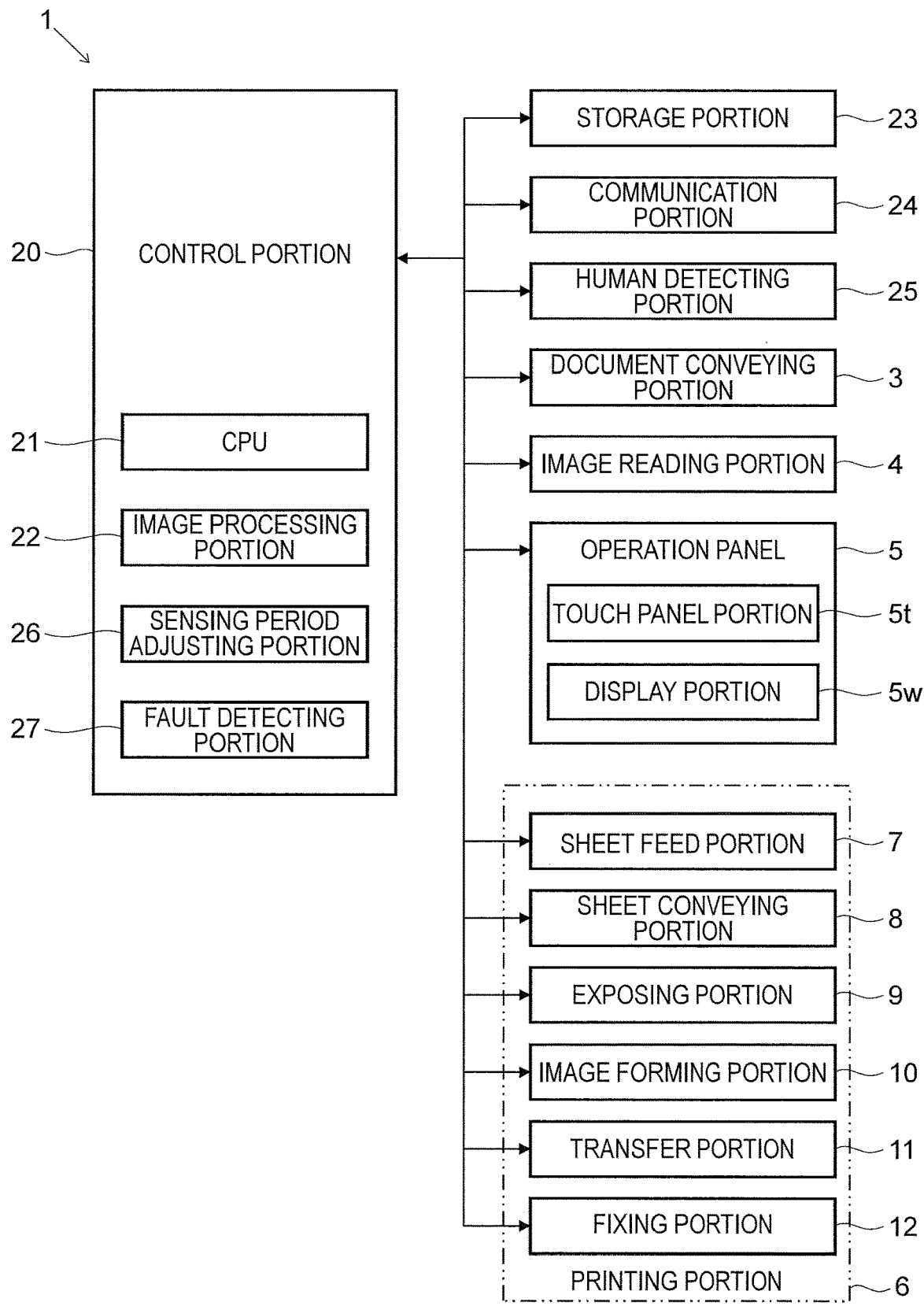
FIG. 5 is a block diagram showing the structure of an image forming apparatus according to a second embodiment of the present disclosure.
Figure 6:
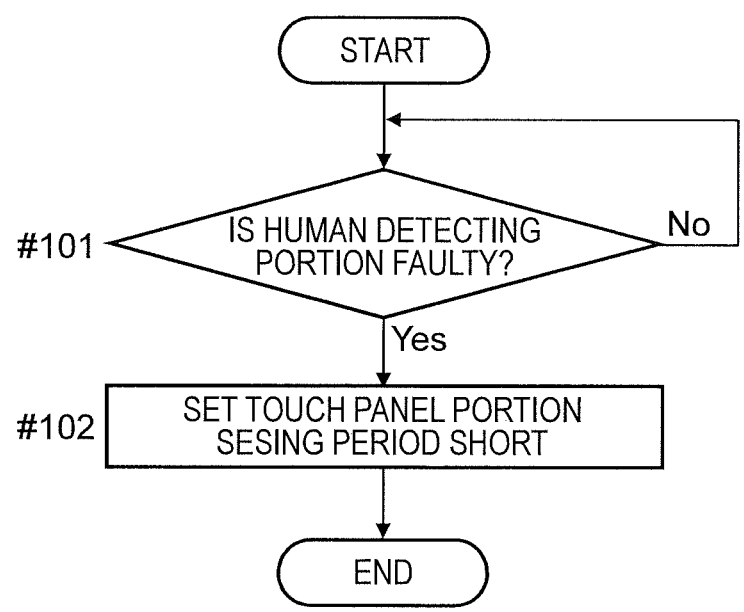
FIG. 6 is a flow chart showing an example of a procedure for setting a sensing period of a touch panel portion in the image forming apparatus according to the second embodiment of the present disclosure.

Next, an image forming apparatus according to a second embodiment of the present disclosure will be described with reference to FIGS. 5 and 6. FIG. 5 is a block diagram showing the structure of the image forming apparatus. FIG. 6 is a flow chart showing an example of a procedure for setting a sensing period of a touch panel portion in the image forming apparatus. The basic configuration in this embodiment is the same as that in the first embodiment; accordingly, such constituent elements as are found also in this embodiment are identified by common reference signs or names, and overlapping description will occasionally be omitted.

The image forming apparatus 1 according to the second embodiment includes a fault detecting portion 27 shown in FIG. 5. The fault detecting portion 27 detects a fault in the human detecting portion 25. For example, in a case where the human detecting portion 25 does not transmit an output indicating the presence of a user even a user is operating the operation panel 5, the fault detecting portion 27 detects that the human detecting portion 25 is faulty. For another example, in a case where the human detecting portion 25 continues transferring an output showing the presence of a user endlessly, the fault detecting portion 27 detects that the human detecting portion 25 is faulty.

When the image forming apparatus 1 starts up (START in FIG. 6), the image forming apparatus 1 checks, by use of the fault detecting portion 27, whether or not the human detecting portion 25 is faulty (at step #101 in FIG. 6). If the human detecting portion 25 is not faulty, then at step #101, the human detecting portion 25 is checked for a fault. If the human detecting portion 25 is faulty, the flow proceeds to step #102.

At step #102, the sensing period adjusting portion 26 sets the touch operation sensing period of the touch panel portion 5t shorter than the sensing period as it is when the detection distance Dd set for the human detecting portion 25 equals the predetermined distance. For example, in a case where the touch operation sensing period as it is when the detection distance Dd of the human detecting portion 25 equals a predetermined distance of 100 cm is 1000 msec, when the fault detecting portion 27 detects a fault in the human detecting portion 25, the sensing period adjusting portion 26 sets the touch operation sensing period at 500 msec, which is shorter than the sensing period of 1000 msec. With this configuration, when the human detecting portion 25 is faulty, it is possible to make the touch panel portion 5t more promptly cope with touch operations by a user. This makes it possible to improve the operability of the image forming apparatus 1.

It should be understood that the embodiments of the present disclosure described above are in no way meant to limit its scope; the present disclosure can be implemented with any modifications made without departing from its spirit.

What is claimed is:

1. An image forming apparatus comprising:
    an operation panel accepting operation including input of an instruction for execution of a job and input of a setting by a user;
    a touch panel portion sensing a touch operation on the operation panel by the user;
    a human detecting portion including a human presence sensor detecting presence of a human body within a previously set detection distance around the image forming apparatus,
    a sensing period adjusting portion increasing and decreasing a touch operation sensing period of the touch panel portion based on a magnitude of the detection distance of the human detecting portion; and
    a fault detecting portion detecting a fault in the human detecting portion,
    wherein
    the fault detected by the fault detecting portion includes a case where the human detecting portion does not transmit an output indicating the presence of the user even when the user is operating the operation panel and a case where the human detecting portion continues transferring an output showing the presence of the user endlessly, and
    when the fault detecting portion detects the fault in the human detecting portion, the sensing period adjusting portion sets the touch operation sensing period of the touch panel portion shorter than the sensing period as it is when the detection distance of the human detecting portion is set a predetermined distance.

2. The image forming apparatus according to claim 1, wherein:
    operation modes of the image forming apparatus include:
    a normal mode in which the image forming apparatus performs normal operation by supplying electric power to all constituent elements; and
    a power-saving mode in which the image forming apparatus performs the power-saving operation by supplying electric power to a part of the constituent elements,
    wherein
    the sensing period adjusting portion increases and decreases, in the power-saving mode, the touch operation sensing period of the touch panel portion based on the the magnitude of detection distance of the human detecting portion, and
    the sensing period adjusting portion sets, in the normal mode, the touch operation sensing period of the touch panel portion shorter than the sensing period in the power-saving mode.

3. The image forming apparatus according to claim 1, wherein
    the longer the detection distance of the human detecting portion is, the longer the sensing period adjusting portion sets the touch operation sensing period of the touch panel portion.

4. The image forming apparatus according to claim 1, wherein
    the operation panel accepts a setting of the detection distance, and
    when the detection distance of the human detecting portion is set shorter than a predetermined distance, the sensing period adjusting portion sets the touch operation sensing period of the touch panel portion shorter than the sensing period as it is when the detection distance of the human detecting portion is set to the predetermined distance.

5. The image forming apparatus according to claim 1, wherein
    the operation panel accepts a setting of the detection distance, and
    when the detection distance of the human detecting portion is set longer than a predetermined distance, the sensing period adjusting portion sets the touch operation sensing period of the touch panel portion longer than the sensing period as it is when the detection distance of the human detecting portion is set the predetermined distance.

* * * * *